US011961489B1

(12) United States Patent
Chen et al.

(10) Patent No.: US 11,961,489 B1
(45) Date of Patent: Apr. 16, 2024

(54) SCAN DRIVING CIRCUIT AND OPERATION METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: De-Fu Chen, Guangdong (CN); Po Lun Chen, Guangdong (CN); Chun-Ta Chen, Guangdong (CN); Ta-Jen Huang, Guangdong (CN); Po-Tsun Liu, Guangdong (CN); Guang-Ting Zheng, Guangdong (CN); Ting-Yi Yi, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/064,278

(22) Filed: Dec. 11, 2022

(30) Foreign Application Priority Data

Oct. 25, 2022 (CN) ......................... 202211309814.4

(51) Int. Cl.
*G09G 5/00* (2006.01)
*G09G 3/36* (2006.01)

(52) U.S. Cl.
CPC ....... *G09G 3/3674* (2013.01); *G09G 2310/08* (2013.01); *G09G 2320/0214* (2013.01); *G09G 2330/021* (2013.01)

(58) Field of Classification Search
CPC ............. G09G 3/3674; G09G 2310/08; G09G 2320/0214; G09G 2330/021
See application file for complete search history.

(56) References Cited

U.S. PATENT DOCUMENTS

| | | | | |
|---|---|---|---|---|
| 9,881,572 B2 * | 1/2018 | Huang | G09G 3/3648 |
| 10,930,360 B2 * | 2/2021 | Liu | G09G 3/20 |
| 11,676,524 B2 * | 6/2023 | Xie | G11C 19/287 345/204 |
| 2010/0177082 A1 * | 7/2010 | Joo | G09G 3/3677 345/87 |

(Continued)

FOREIGN PATENT DOCUMENTS

TW 1712020 B * 12/2020

*Primary Examiner* — Joe H Cheng
(74) *Attorney, Agent, or Firm* — CKC & Partners Co., LLC

(57) ABSTRACT

The present disclosure provides a scan driving circuit, which includes a pull-up output charging circuit, a pull-down discharge circuit, a pre-charge circuit, an anti-noise start-up circuit and an anti-noise pull-down discharge circuit. The pull-up output charging circuit is electrically connected to an output terminal, and the pull-down discharge circuit is electrically connected to the output terminal. The pre-charge circuit is electrically connected to the pull-up output charging circuit and the pull-down discharge circuit through a driving node. The anti-noise start-up circuit is electrically connected to the pre-charge circuit. The anti-noise pull-down discharge circuit is electrically connected to the anti-noise start-up circuit, and the anti-noise pull-down discharge circuit is electrically connected to the driving node.

20 Claims, 6 Drawing Sheets

(56) References Cited

U.S. PATENT DOCUMENTS

| | | | | |
|---|---|---|---|---|
| 2013/0169609 | A1* | 7/2013 | Son | G11C 19/287 345/209 |
| 2018/0061350 | A1* | 3/2018 | Sung | G09G 3/3696 |
| 2019/0103049 | A1* | 4/2019 | Noh | G09G 3/2092 |
| 2019/0139475 | A1* | 5/2019 | Wang | G11C 7/02 |
| 2019/0287446 | A1* | 9/2019 | Liao | G11C 19/28 |
| 2022/0101796 | A1* | 3/2022 | Feng | G09G 3/3266 |

* cited by examiner

SCAN DRIVING CIRCUIT AND OPERATION METHOD THEREOF

RELATED APPLICATION

This application claims priority to China Application Serial Number 202211309814.4, filed Oct. 25, 2022, which is herein incorporated by reference.

BACKGROUND

Field of Invention

The present invention relates to scan driving systems and scan driving methods, and more particularly, a scan driving circuit and an operation method thereof.

Description of Related Art

In recent years, with the vigorous development of display technology, active organic light emitting diode display technology with advantages such as high contrast ratio and low power consumption has been widely used in mobile phones, tablets, and screen displays. In today's market, transistor liquid crystal displays have a huge market share. This technology mainly integrates panel technology to meet the requirements of high reliability and high resolution. The function of the scan driving circuit in the display is to turn on the switch transistor of the pixel to facilitate writing data into the storage capacitor in the liquid crystal unit.

However, when the traditional scan driving circuit is in a non-working state, this circuit has noise problems such as electric leakage or power consumption, which may lead to a decrease in reliability.

In view of the foregoing, there still exist some problems on the traditional scan driving circuit that await further improvement. However, those skilled in the art sought vainly for a solution. Accordingly, there is an urgent need in the related field to prevent the noise problem of the electric leakage in the non-working state.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a scan driving circuit and its operation method, to solve or circumvent aforesaid problems and disadvantages in the related art.

An embodiment of the present disclosure is related to a scan driving circuit, and the scan driving circuit includes a pull-up output charging circuit, a pull-down discharge circuit, a pre-charge circuit, an anti-noise start-up circuit and an anti-noise pull-down discharge circuit. The pull-up output charging circuit is electrically connected to an output terminal, and the pull-down discharge circuit is electrically connected to the output terminal. The pre-charge circuit is electrically connected to the pull-up output charging circuit and the pull-down discharge circuit through a driving node. The anti-noise start-up circuit is electrically connected to the pre-charge circuit. The anti-noise pull-down discharge circuit is electrically connected to the anti-noise start-up circuit, and the anti-noise pull-down discharge circuit is electrically connected to the driving node.

In one embodiment of the present disclosure, the scan driving circuit further includes a voltage boost circuit is electrically connected to the driving node.

In one embodiment of the present disclosure, the voltage boost circuit includes a transistor electrically connected to the driving node through a capacitor. One end of the transistor is electrically connected to the capacitor, and another end and a gate of the transistor is electrically coupled to a driving node of a next-stage scan driving circuit.

In one embodiment of the present disclosure, the pre-charge circuit includes two transistors connected in series with each other. The two transistors are electrically connected between a first start signal terminal and the driving node, and two gates of the two transistors are electrically connected to a first clock signal terminal.

In one embodiment of the present disclosure, the pull-up output charging circuit includes a transistor and another transistor. The transistor is electrically connected between a first voltage terminal and the output terminal, and a gate of the transistor is electrically connected to a connection point between the anti-noise start-up circuit and the anti-noise pull-down discharge circuit. The aforesaid another transistor is electrically connected between a second start signal terminal and a second clock signal terminal, and a gate of the aforesaid another transistor is electrically connected to the driving node.

In one embodiment of the present disclosure, the pull-down discharge circuit includes a transistor and another transistor. The transistor is electrically connected between a second voltage terminal and a second start signal terminal, and a gate of the transistor is electrically connected to a connection point between the anti-noise start-up circuit and the anti-noise pull-down discharge circuit. The aforesaid another transistor is electrically connected between the output terminal and the second voltage terminal, and a gate of the aforesaid another transistor is electrically connected to the driving node.

In one embodiment of the present disclosure, the anti-noise start-up circuit includes two transistors and another two transistors. The two transistors are connected in series with each other, the two transistors are electrically connected between a second voltage terminal and a first voltage terminal, a gate of one of the two transistors is electrically connected to the pre-charge circuit, and a gate of another of the two transistors is electrically connected to the first voltage terminal. The another two transistors are connected in series with each other, the another two transistors are electrically connected between the second voltage terminal and the first voltage terminal, a gate of one of the another two transistors is electrically connected to the pre-charge circuit, and a gate of another of the another two transistors is electrically connected between the two transistors.

In one embodiment of the present disclosure, the anti-noise pull-down discharge circuit includes two transistors connected in series with each other. The two transistors are electrically connected between a second voltage terminal and the driving node, and two gates of the two transistors are electrically connected to the anti-noise start-up circuit.

In one embodiment of the present disclosure, the pull-up output charging circuit is electrically connected to a first voltage terminal, the pull-down discharge circuit is electrically connected to a second voltage terminal, the anti-noise start-up circuit is electrically connected between the second voltage terminal and the first voltage terminal, the anti-noise pull-down discharge circuit is electrically connected between the second voltage terminal and the driving node, and a first voltage level of the first voltage terminal is higher than a second voltage level of the second voltage terminal.

In one embodiment of the present disclosure, the pre-charge circuit is controlled by a first clock signal terminal, the pre-charge circuit is electrically connected between a first start signal terminal and the driving node, the pull-up output charging circuit and the pull-down discharge circuit both are electrically connected to a second start signal terminal, the pull-up output charging circuit is electrically connected to a second clock signal terminal, and a second clock signal of the second clock signal terminal is opposite to a first clock signal of the first clock signal terminal.

Another embodiment of the present disclosure is related to a scan driving circuit, and the scan driving circuit includes a pull-up output charging circuit, a pull-down discharge circuit, an anti-noise start-up circuit and an anti-noise pull-down discharge circuit. The pull-up output charging circuit is electrically connected to a first voltage terminal. The pull-down voltage discharge circuit is electrically connected to a second voltage terminal, and a first voltage level of the first voltage terminal is higher than a second voltage level of the second voltage terminal. The anti-noise pull-down discharge circuit is electrically connected to the pull-up output charging circuit and the pull-down discharge circuit through a driving node, and the pull-up output charging circuit and the pull-down discharge circuit are electrically connected to an output terminal. The anti-noise start-up circuit is electrically connected to the anti-noise pull-down discharge circuit. In a non-working state, the anti-noise start-up circuit enables the anti-noise pull-down discharge circuit to pull down an electric potential of the driving node, so as to disable the pull-down discharge circuit and to enable the pull-up output charging circuit, thereby pulling up an electric potential of the output terminal.

In one embodiment of the present disclosure, the scan driving circuit further includes a pre-charge circuit electrically connected between a first start signal terminal and the driving node, where the pre-charge circuit is controlled by a first clock signal terminal. In a start period, the first clock signal terminal turns on the pre-charge circuit, the first start signal terminal receives a first start signal, so that the pre-charge circuit charges the driving node to a first driving level for disabling the pull-up output charging circuit and enabling the pull-down discharge circuit, thereby pulling down the electric potential of the output terminal to output a control signal.

In one embodiment of the present disclosure, the scan driving circuit further includes a voltage boost circuit electrically connected to the driving node. In a voltage enhancement period, the voltage boost circuit feeds a voltage of a driving node of a next-stage scan driving circuit back to couple the driving node of the scan driving circuit, thereby the driving node is boosted from a first driving level to a second driving level, so that the electric potential of the output terminal is maintained to output a control signal.

In one embodiment of the present disclosure, the scan driving circuit further includes a pre-charge circuit electrically connected between a first start signal terminal and the driving node, where the pre-charge circuit is controlled by a first clock signal terminal. In an output completion period, the first start signal terminal is in the second voltage level, the first clock signal terminal turns on the pre-charge circuit, so that the pre-charge circuit pulls down the electric potential of the driving node, for enabling the pull-up output charging circuit to pull up the electric potential of the output terminal, thereby completing an output of a control signal.

In one embodiment of the present disclosure, the anti-noise start-up circuit is electrically connected between the second voltage terminal and the first voltage terminal, and the anti-noise pull-down discharge circuit is electrically connected between the second voltage terminal and the driving node. In an anti-noise period, the anti-noise start-up circuit electrically isolates the second voltage terminal from a connection point between the anti-noise start-up circuit and the anti-noise pull-down discharge circuit, the anti-noise start-up circuit increases an electric potential of the connection point through the first voltage level of the first voltage terminal to turn on the anti-noise pull-down discharge circuit, thereby pulling down the electric potential of the driving node.

Yet another embodiment of the present disclosure is related to an operation method of a scan driving circuit, the scan driving circuit includes a pull-up output charging circuit, a pull-down discharge circuit, an anti-noise pull-down discharge circuit and an anti-noise pull-down discharge circuit, the anti-noise pull-down discharge circuit electrically connected to the pull-up output charging circuit and the pull-down discharge circuit through a driving node, the pull-up output charging circuit and the pull-down discharge circuit electrically connected to an output terminal, and the operation method includes steps of: in a non-working state, enabling the anti-noise pull-down discharge circuit through the anti-noise start-up circuit to pull down an electric potential of the driving node; when the electric potential of the driving node is pulled down, disabling the pull-down discharge circuit and enabling the pull-up output charging circuit, thereby pulling up an electric potential of the output terminal.

In one embodiment of the present disclosure, the scan driving circuit further includes a pre-charge circuit, and the operation method further includes steps of: in a start period, charging the driving node to a first driving level through the pre-charge circuit, for disabling the pull-up output charging circuit and enabling the pull-down discharge circuit, thereby pulling down the electric potential of the output terminal potential to output a control signal.

In one embodiment of the present disclosure, the scan driving circuit further includes a voltage boost circuit, and the operation method further includes steps of: in a voltage enhancement period, feeding a voltage of a driving node of a next-stage scan driving circuit back to couple the driving node of the scan driving circuit, so as to boost the driving node from a first driving level to a second driving level, so that the electric potential of the output terminal is maintained to output a control signal.

In one embodiment of the present disclosure, the scan driving circuit further includes a pre-charge circuit, and the operation method further includes steps of: in an output completion period, pulling down the electric potential of the driving node through the pre-charge circuit, for enabling the pull-up output charging circuit to pull up the electric potential of the output terminal, thereby completing an output of a control signal.

In one embodiment of the present disclosure, the anti-noise start-up circuit is electrically connected between a second voltage terminal and a first voltage terminal, a first voltage level of the first voltage terminal is high than a second voltage level of the second voltage terminal, the anti-noise pull-down discharge circuit is electrically connected between the second voltage terminal and the driving node, and the operation method further includes steps of: in an anti-noise period, using the anti-noise start-up circuit for electrically isolating the second voltage terminal from a connection point between the anti-noise start-up circuit and the anti-noise pull-down discharge circuit, so that the anti-noise start-up circuit increases an electric potential of the connection point through the first voltage level of the first voltage terminal to turn on the anti-noise pull-down discharge circuit, thereby pulling down the electric potential of the driving node.

In view of the above, according to the present disclosure, the scan driving circuit and its operation method of the present disclosure can prevent the problem of electric leakage in the non-working state, so as to achieve the effect of saving power consumption.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
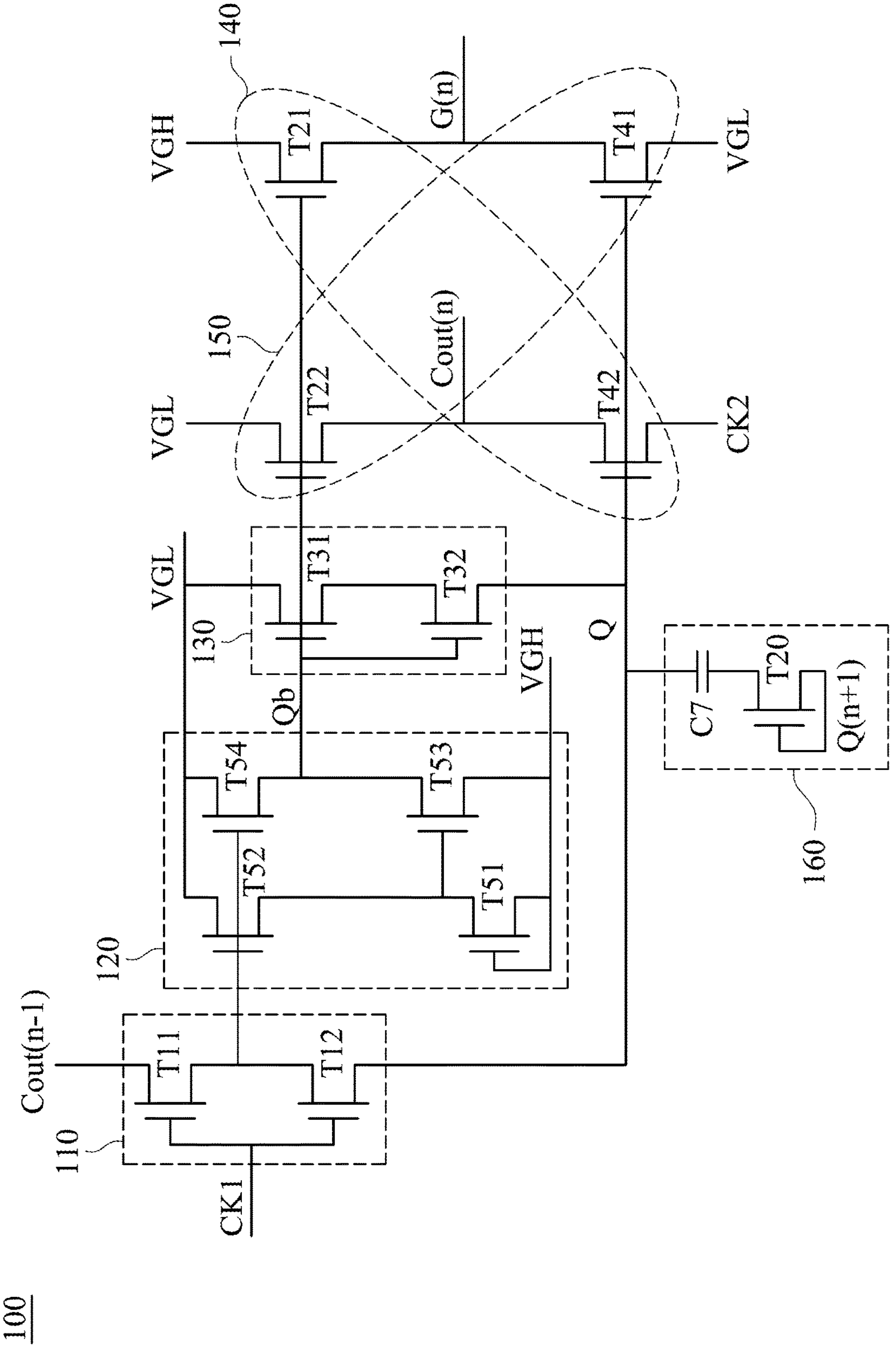
FIG. 1 is a block diagram of a scan driving circuit according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used in the description herein and throughout the claims that follow, the meaning of “a”, “an”, and “the” includes reference to the plural unless the context clearly dictates otherwise.

As used in the description herein and throughout the claims that follow, the meaning of “in” includes “in” and “on” unless the context clearly dictates otherwise.

As used herein, “around”, “about”, “substantially” or “approximately” shall generally mean within 20 percent, preferably within 10 percent, and more preferably within 5 percent of a given value or range. Numerical quantities given herein are approximate, meaning that the term “around”, “about”, “substantially” or “approximately” can be inferred if not expressly stated.

Also, as used in the description herein and throughout the claims that follow, the terms “comprise or comprising”, “include or including”, “have or having”, “contain or containing” and the like are to be understood to be open-ended, i.e., to mean including but not limited to.

Referring to FIG. 1. In one aspect, the present disclosure is directed to a scan driving circuit 100. This circuit may be easily integrated into a glass of the display and may be applicable or readily adaptable to all technologies. The scan driving circuit 100 of the present disclosure can prevent the problem of electric leakage in the non-working state, so as to achieve the effect of saving power consumption. Accordingly, the scan driving circuit 100 has advantages.

Herewith the scan driving 100 is described below with FIG. 1.

The subject disclosure provides the scan driving 100 of FIG. 1 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word “exemplary” is used herein to mean “serving as an example, instance, or illustration.” Any embodiment described herein as “exemplary” is not necessarily to be construed as preferred or advantageous over other embodiments.

FIG. 1 is a block diagram of the scan driving circuit 100 according to some embodiments of the present disclosure. As shown in FIG. 1, the scan driving circuit 100 can at least include a pull-up output charging circuit 140, a pull-down discharge circuit 150, an anti-noise start-up circuit 120 and an anti-noise pull-down discharge circuit 130.

Structurally, the pull-up output charging circuit 140 is electrically connected to the first voltage terminal VGH. The pull-down discharge circuit 150 is electrically connected to the second voltage terminal VGL, and the first voltage level of the first voltage terminal VGH is higher than the second voltage level of the second voltage terminal VGL; for example, the first voltage level of the first voltage terminal VGH can be a relatively high voltage level, and the second voltage level of the second voltage terminal VGL can be a relatively low voltage level, the aforementioned relatively high voltage level can be a positive voltage level (e.g., about 3V), and the aforementioned relatively low voltage level may be a negative voltage level (e.g., about −3V). The anti-noise start-up circuit 120 is electrically connected to the anti-noise pull-down discharge circuit 130. The anti-noise pull-down discharge circuit 130 is electrically connected to the pull-up output charging circuit 140 and the pull-down discharge circuit 150 through the driving node Q, and the pull-up output charging circuit 140 and the pull-down discharge circuit 150 are electrically connected to the output terminal G(n), where n can be a positive integer; for example, G(1) represents the output terminal of the first-stage scan driving circuit, G(10) represents the output terminal of the tenth-stage scan driving circuit, and G(20) represents the output terminal of the twentieth-stage scan driving circuit, and so on. The output terminal G(n) can be electrically connected to a corresponding switch transistor in the pixel circuit.

With the above structure, in the non-working state, the anti-noise start-up circuit 120 enables the anti-noise pull-down discharge circuit 130 to pull down the electric potential of the driving node Q, for disabling the pull-down discharge circuit 150 and enabling the pull-up output charging circuit 140, thereby pulling up the electric potential of output terminal G(n), so that the corresponding switch transistor (e.g., a P-type transistor) in the pixel circuit is turned off. In this way, the scan driving circuit 100 can prevent the problem of electric leakage in the non-working state, so as to achieve the effect of saving power consumption.

As shown in FIG. 1, in one or more embodiments of the present disclosure, the scan driving circuit 100 can include a pre-charge circuit 110. Structurally, the pre-charge circuit 110 is electrically connected to the pull-up output charging circuit 150 and the pull-down discharge circuit 140 through the driving node Q, and the anti-noise start-up circuit 120 is electrically connected to the pre-charge circuit 110. The pre-charge circuit 110 is electrically connected between the first start signal terminal Cout(n−1) and the driving node Q, and the pre-charge circuit 110 is controlled by the first clock signal terminal CK1.

With the above structure, when the scan driving circuit 100 starts to output the control signal in the working state, in the start period, the first clock signal terminal CK1 turns on the pre-charge circuit 110, and the first start signal terminal Cout(n−1) receives the first start signal (e.g., about 3V), so that the pre-charge circuit 110 can charge the driving node Q to the first driving level (e.g., about 2-3V), so as to disable the pull-up output charging circuit 140 and enable the pull-down discharge circuit 150, thereby pulling down the electric potential of output terminal G(n) (e.g., about −3V) to output the control signal (e.g., a turn-on signal), and the control signal turns on the switch transistor of the pixel circuit to facilitate the writing of data to the storage capacitor.

As shown in FIG. 1, in one or more embodiments of the present disclosure, the scan driving circuit 100 can include a voltage boost circuit 160. Structurally, the voltage boost circuit 160 is electrically connected to the driving node Q, and the voltage boost circuit 160 is electrically coupled to the driving node Q(n+1) of the next-stage scan driving circuit.

With the above-mentioned structure, after the above-mentioned start period, in the voltage enhancement period, the voltage boost circuit 160 feeds the voltage of the driving node Q(n+1) of the next-stage scan driving circuit back to couple the driving node Q of the scan driving circuit 100, so as to boost the driving node Q from the first driving level (e.g., about 2-3V) to the second driving level (e.g., about 4-5V), so that the electric potential of the output terminal G(n) is maintained to output the control signal. Thus, the scan driving circuit 100 has good driving ability, and the control signal outputted by the scan driving circuit 100 can have good rise time and fall time.

After the above-mentioned voltage enhancement period, in the output completion period, the first start signal terminal Cout(n−1) is in the second voltage level (e.g., about −3V), and the first clock signal terminal CK1 turns on the pre-charge circuit, so that the pre-charge circuit 110 can pull down the electric potential of the driving node Q, for enabling the pull-up output charging circuit 140 to pull up the electric potential of the output terminal G(n), thereby completing the output of the control signal.

As shown in FIG. 1, in one or more embodiments of the present disclosure, the anti-noise start-up circuit 120 is electrically connected between the second voltage terminal VGL and the first voltage terminal VGH, and the anti-noise pull-down discharge circuit 130 is electrically connected between the second voltage terminal VGL and the driving node Q.

With the above structure, after the above output completion period, in the anti-noise period, the anti-noise start-up circuit 120 electrically isolates the second voltage terminal VGL from the connection point Qb between the anti-noise start-up circuit 120 and the anti-noise pull-down discharge circuit 130. The anti-noise start-up circuit 120 increases the electric potential of the connection point Qb through the first voltage level of the first voltage terminal VGH to turn on the anti-noise pull-down discharge circuit 130, thereby pulling down the electric potential of the driving node Q. Compared with the traditional scan driving circuit, the anti-leakage design (e.g., the anti-noise start-up circuit 120 and the anti-noise pull-down discharge circuit 130) is added to the scan driving circuit 100, which can increase the stability of the circuit.

Regarding the circuit structure of the anti-noise start-up circuit 120, as shown in FIG. 1, in one or more embodiments of the present disclosure, the anti-noise start-up circuit 120 includes transistors T52 and T51 connected in series with each other, and transistors T54 and T53 connected in series with each other.

Structurally, the serially connected transistors T52 and T51 are electrically connected between the second voltage terminal VGL and the first voltage terminal VGH, the gate of the transistor T52 is electrically connected to the pre-charge circuit 110, and the gate of the transistor T51 is electrically connected to the first voltage terminal VGH. The serially connected transistors T54 and T53 are connected between the second voltage terminal VGL and first voltage terminal VGH, the gate of the transistor electrical T54 is electrically connected to the pre-charge circuit 110, and the gate of the transistor electrical T53 is electrically connected between the two transistors T52 and T51.

Regarding the circuit structure of the anti-noise pull-down discharge circuit 130, as shown in FIG. 1, in one or more embodiments of the present disclosure, the anti-noise pull-down discharge circuit 130 includes transistors T31 and T32 connected in series with each other.

Structurally, the serially connected transistors T31 and T32 are electrically connected between the second voltage terminal VGL and the driving node Q, and the two gates of the transistors T31 and T32 are electrically connected to the anti-noise start-up circuit 120. When the anti-noise pull-down discharge circuit 130 is enabled, the transistors T31 and T32 are turned on.

Regarding the circuit structure of the voltage boost circuit 160, as shown in FIG. 1, in one or more embodiments of the present disclosure, the voltage boost circuit 160 includes a transistor T20. Structurally, the transistor T20 is electrically connected to driving node Q through capacitor C7. One end of transistor T20 is electrically connected to capacitor C7, and another end and the gate of transistor T20 is electrically coupled to the driving node Q(n+1) of the next-stage scan driving circuit. In this way, the voltage boost circuit 160 uses the capacitive coupling characteristic of the capacitor C7 with the signal feedback, so as to perform the voltage boosting action on the driving node Q, thereby improving the driving capability.

Regarding the circuit structure of the pre-charge circuit 110, as shown in FIG. 1, in one or more embodiments of the present disclosure, the pre-charge circuit 110 includes transistors T11 and T12 connected in series. Structurally, the transistors T11 and T12 are electrically connected between the first start signal terminal Cout(n−1) and the driving node Q, and the two gates of the transistors T11 and T12 are electrically connected to the first clock signal terminal CK1.

Regarding the circuit structure of the pull-up output charging circuit 140, as shown in FIG. 1, in one or more embodiments of the present disclosure, the pull-up output charging circuit 140 is electrically connected to the first voltage terminal VGH, the pull-up output charging circuit 140 is electrically connected to the second start signal terminal Cout(n), and the pull-up output charging circuit 140 is electrically connected to the second clock signal terminal CK2.

Specifically, the pull-up output charging circuit 140 includes a transistor T21 and a transistor T42. Structurally, the transistor T21 is electrically connected between the first voltage terminal VGH and the output terminal G(n), and the gate of the transistor T21 is electrically connected to the connection point Qb between the anti-noise start-up circuit 120 and the anti-noise pull-down discharge circuit 130. The transistor T42 is electrically connected between the second start signal terminal Cout(n) and the second clock signal terminal CK2, and the gate of the transistor T42 is electrically connected to the driving node Q.

When the pull-up output charging circuit 140 is enabled, the transistor T21 is turned on, and the transistor T42 is turned off. Conversely, when the pull-up output charging circuit 140 is disabled, the transistor T21 is turned off and the transistor T42 is turned on.

Regarding the circuit structure of the pull-down discharge circuit 150, as shown in FIG. 1, in one or more embodiments of the present disclosure, the pull-down discharge circuit 150 is electrically connected to the second voltage terminal VGL, and the pull-down discharge circuit 150 is electrically connected to the second start signal terminal Cout(n).

Specifically, the pull-down discharge circuit 150 includes a transistor T22 and a transistor T41. Structurally, the transistor T22 is electrically connected between the second voltage terminal VGL and the second start signal terminal Cout(n), and the gate of the transistor T22 is electrically connected to the connection point Qb between the anti-noise start-up circuit 120 and the anti-noise pull-down discharge circuit 130. The transistor T41 is electrically connected between the output terminal G(n) and the second voltage terminal VGL, and the gate of the transistor T41 is electrically connected to the driving node Q.

When the pull-down discharge circuit 150 is enabled, the transistor T41 is turned on, and the transistor T22 is turned off. Conversely, when the pull-down discharge circuit 150 is disabled, the transistor T41 is turned off, and the transistor T22 is turned on.

In a control experiment, the scan driving circuit 100 omits the anti-noise start-up circuit 120 and the anti-noise pull-down discharge circuit 130; when the display operates, the scan driving circuit 100 (e.g., the gate driving circuit) is are in the off state, and thus the voltage value required by the internal liquid crystal for displaying colors may be interfered by the noise interference of the voltage source, the clock signal or the parasitic capacitance coupling, so that the incorrect output of the output point G(n) may cause the display panel to generate the flicker or an incorrect picture. Therefore, the scan driving circuit 100 of the present disclosure uses the anti-noise block (i.e., the anti-noise start-up circuit 120 and the anti-noise pull-down discharge circuit 130) to pull up the electric potential of the output point G(n) in the non-working state to a high level through the transistor T41, to avoid turning on the P-type switch transistor of the pixel circuit, so that the gate line closed for maintaining the voltage value of the liquid crystal.

Figure 2:
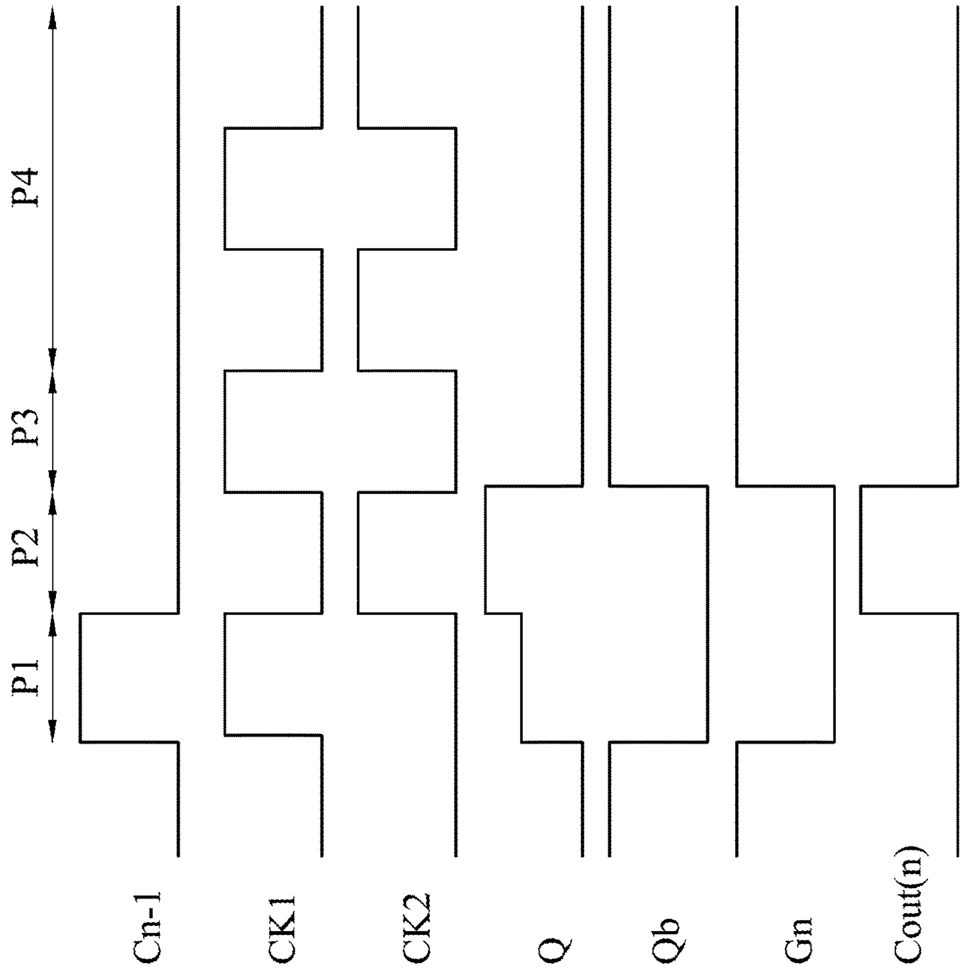
FIG. 2 is a timing diagram of an operation method of the scan driving circuit according to some embodiments of the present disclosure.

In order to further illustrate the operation method of the scan driving circuit 100, refer to FIG. 1 and FIG. 2. FIG. 2 is a timing diagram of an operation method of the scan driving circuit 100 according to some embodiments of the present disclosure. Gn in FIG. 2 is the output terminal G(n) in FIG. 1, and Cn−1 in FIG. 2 is the first start signal terminal Cout(n−1) in FIG. 1. As shown in FIG. 2, the operation method includes a start period P1, a voltage enhancement period P2, an output completion period P3 and an anti-noise period P4. In one or more embodiments of the present disclosure, the second clock signal of the second clock signal terminal CK2 is opposite to the first clock signal of the first clock signal terminal CK1.

In the start period P1, the first start signal terminal Cout(n−1) receives the first start signal with the first voltage level, the first clock signal of the first clock signal terminal CK1 is the first voltage level, the second clock signal of the second clock signal terminal CK2 is the second voltage level, and the second start signal terminal Cout(n) is in the second voltage level. For example, the first voltage level is about 3V and the second voltage level is about −3V. The transistors T11 and T12 of the pre-charge circuit 110 are turned on, the transistors T51, T52 and T54 of the anti-noise start-up circuit are turned on, the transistor T53 of the anti-noise start-up circuit is turned off, the transistors T31 and T32 of the anti-noise pull-down discharge circuit 130 are turned off, the transistor T20 of the voltage boost circuit 160 is turned off, the transistor T21 of the pull-up output charging circuit 140 is turned off, the transistor T42 of the pull-up output charging circuit 140 is turned on, the transistor T22 of the pull-down discharge circuit 150 is turned off, and the transistor T41 of the pull-down discharge circuit 150 is turned on. In this way, in the start period P1, the driving node Q is charged to the first driving level through the pre-charge circuit 110, for disabling the pull-up output charging circuit 140 and enabling the pull-down discharge circuit 150, thereby pulling down the electric potential of the output terminal G(n) to output the control signal.

In the voltage enhancement period P2, the first start signal terminal Cout (n−1) is in the second voltage level, the first clock signal of the first clock signal terminal CK1 is the second voltage level, the second clock signal of the second clock signal terminal CK2 is the first voltage level, and the second start signal terminal Cout(n) receives the second start signal with the first voltage level. For example, the first voltage level is about 3V, and the second voltage level is about −3V. The transistors T11 and T12 of the pre-charge circuit 110 are turned off, transistors T51, T52 and T54 of the anti-noise start-up circuit are turned on, the transistor T53 of the anti-noise start-up circuit is turned off, the transistors T31 and T32 of the anti-noise pull-down discharge circuit 130 are turned off, the transistor T20 of the voltage boost circuit 160 is turned on, the transistor T21 of the pull-up output charging circuit 140 is turned off, the transistor T42 of the pull-up output charging circuit 140 is turned on, the transistor T22 of the pull-down discharge circuit 150 is turned off, and the transistor T41 of the pull-down discharge circuit 150 is turned on. In this way, in the voltage enhancement period P2, the voltage of the driving node Q(n+1) of the next-stage scan driving circuit is fed back to couple the driving node Q of the scan driving circuit through the voltage boost circuit 160, so as to boost the driving node Q from the first driving level to the second driving level, so that the electric potential of the output terminal G(n) is maintained to output the control signal.

In the output completion period P3, the first start signal terminal Cout(n−1) is in the second voltage level, the first clock signal of the first clock signal terminal CK1 is the first voltage level, the second clock signal of the second clock signal terminal CK2 is the second voltage level, and the second start signal terminal Cout(n) is in second voltage level. For example, the first voltage level is about 3V, and the second voltage level is about −3V. The transistors T11 and T12 of the pre-charge circuit 110 are turned on, the transistors T51 and T53 of the anti-noise start-up circuit are turned on, the transistors T52 and T54 of the anti-noise start-up circuit are turned off, the transistors T31 and T32 of the anti-noise pull-down discharge circuit 130 are turned on, the transistor T20 of the voltage boost circuit 160 is turned on, the transistor T21 of the pull-up output charging circuit 140 is turned on, the transistor T42 of the pull-up output charging circuit 140 is turned off, the transistor T22 of the pull-down discharge circuit 150 is turned on, and the transistor T41 of the pull-down discharge circuit 150 is turned off. In this way, in the output completion period P3, the electric potential of the driving node Q is pulled down through the pre-charge circuit 110, for enabling the pull-up output charging circuit 140 to pull up the electric potential of the output terminal G(n), thereby completing the output of the control signal.

In the anti-noise period P4, the first start signal terminal Cout(n−1) is in the second voltage level, the first clock signal of the first clock signal terminal CK1 is the second voltage level, the second clock signal of the second clock signal terminal CK2 is the first voltage level, and the second start signal terminal Cout(n) is in the second voltage level. For example, the first voltage level is about 3V, and the second voltage level is about −3V. The transistors T11 and T12 of the pre-charge circuit 110 are turned on, the transistors T51 and T53 of the anti-noise start-up circuit are turned on, the transistors T52 and T54 of anti-noise start-up circuit are turned off, the transistors T31 and T32 of anti-noise pull-down discharge circuit 130 are turned on, the transistor T20 of the voltage boost circuit 160 is turned on, the transistor T21 of the pull-up output charging circuit 140 is turned on, the transistor T42 of the pull-up output charging circuit 140 is turned off, the transistor T22 of the pull-down discharge circuit 150 is turned on, and the transistor T41 of the pull-down discharge circuit 150 is turned off. In this way, in the anti-noise period P4, the anti-noise start-up circuit 120 electrically isolates the second voltage terminal VGL from the connection point Qb between the anti-noise start-up circuit 120 and the anti-noise pull-down discharge circuit 130, and the anti-noise start-up circuit 120 increases the electric potential of the connection point Qb through the first voltage level of the first voltage terminal VGH, so as to turn on the anti-noise pull-down discharge circuit 130, thereby pulling down the electric potential of the driving node Q.

In view of above, for example, both the output completion period P3 and the anti-noise period P4 both can be the non-working state, but the present disclosure is not limited thereto. In one or more embodiments of the present disclosure, in the non-working state, the anti-noise pull-down discharge circuit 130 is enabled through the anti-noise start-up circuit 120 to pull down the electric potential of the driving node Q; when the electric potential of the driving node Q is is pulled down, the pull-down discharge circuit 150 is disabled and the pull-up output charging circuit 140 is enabled, thereby pulling up the electric potential of the output terminal G(n), so that the corresponding transistor (e.g., the P-type transistor) in the pixel circuit is turned off. In this way, the operation method of the scan driving circuit 100 can prevent the problem of electric leakage in the non-working state, so as to achieve the effect of saving power consumption.

Figure 3:
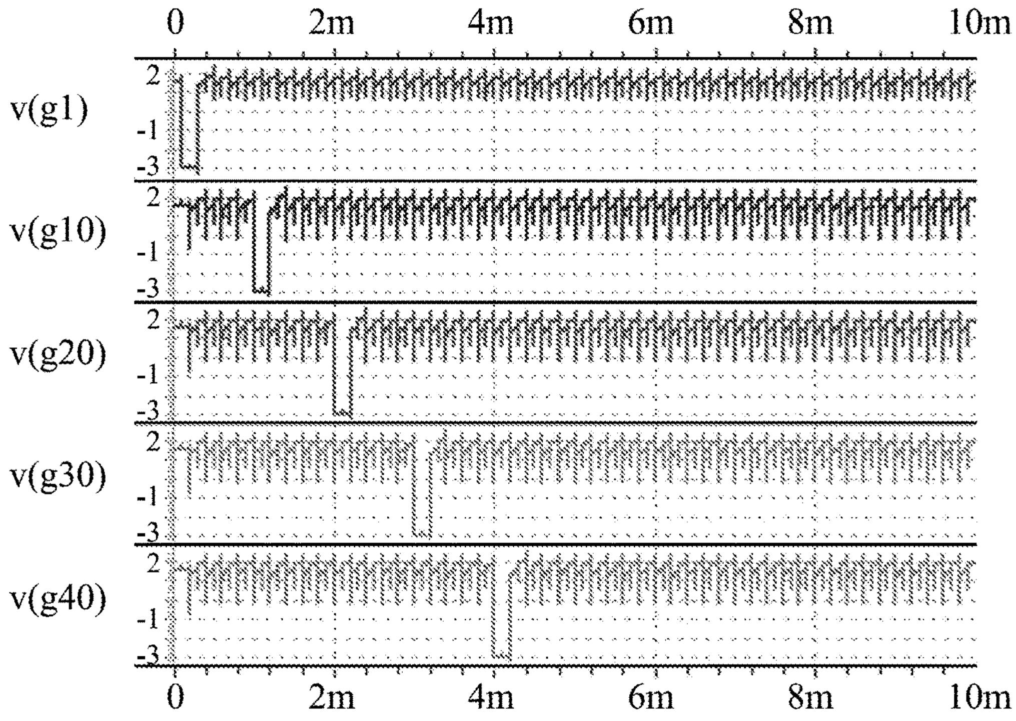
FIG. 3 and FIG. 4 are waveform diagrams of output terminals of various stages scan driving circuits according to some embodiments of the present disclosure.
Figure 4:
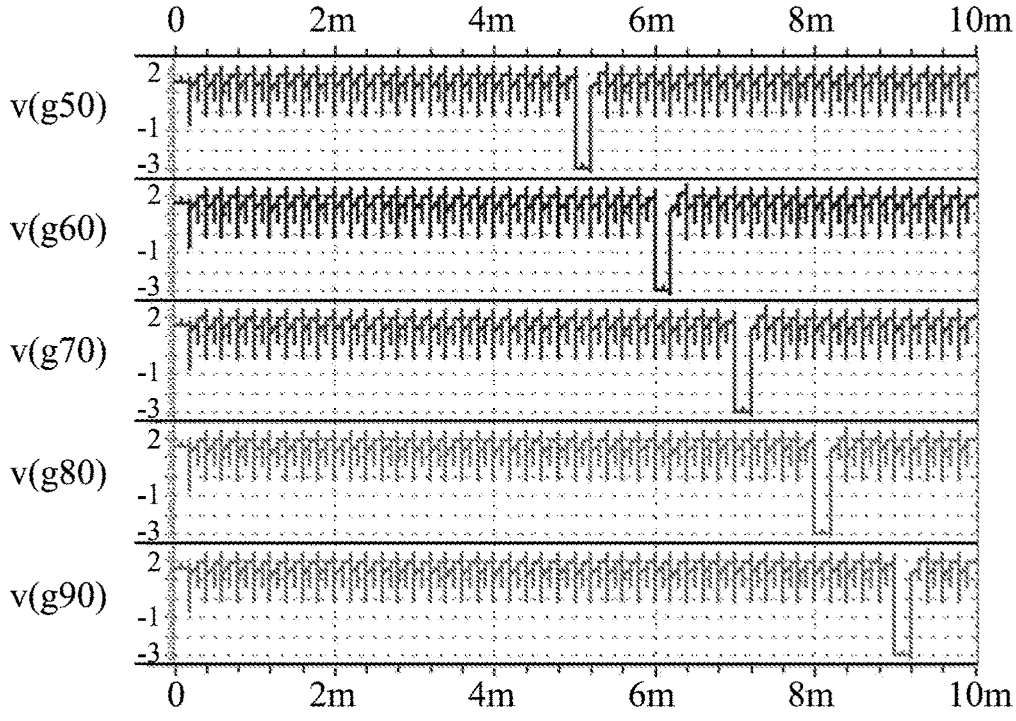
Figure 5:
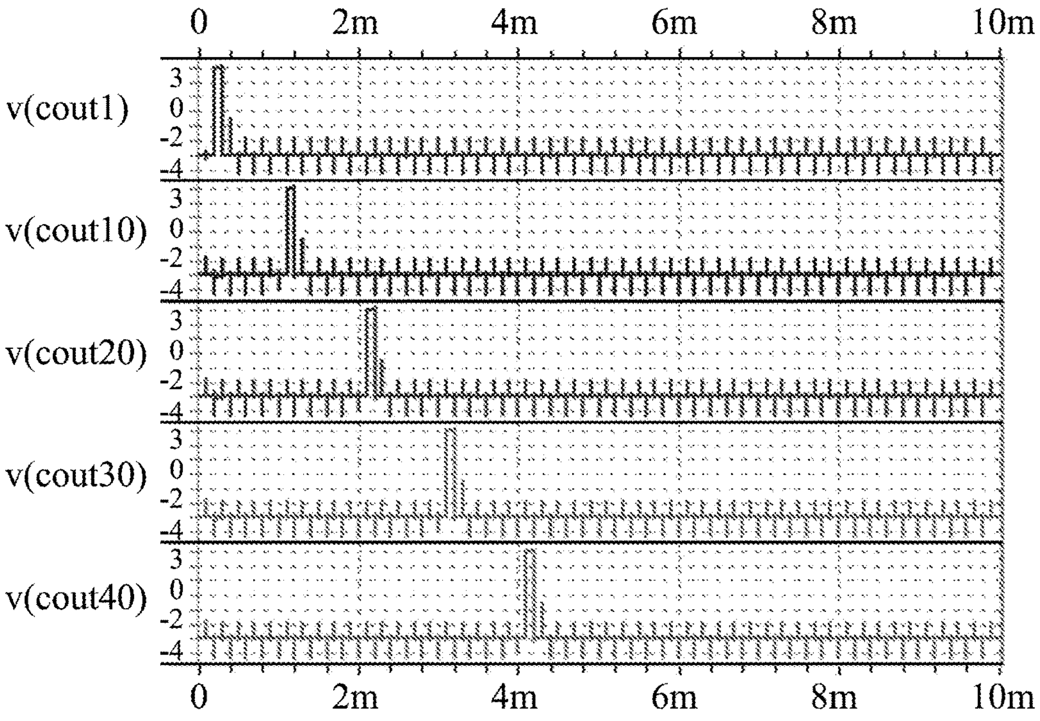
FIG. 5 and FIG. 6 are waveform diagrams of second start signal terminals of various stages scan driving circuits according to some embodiments of the present disclosure.
Figure 6:
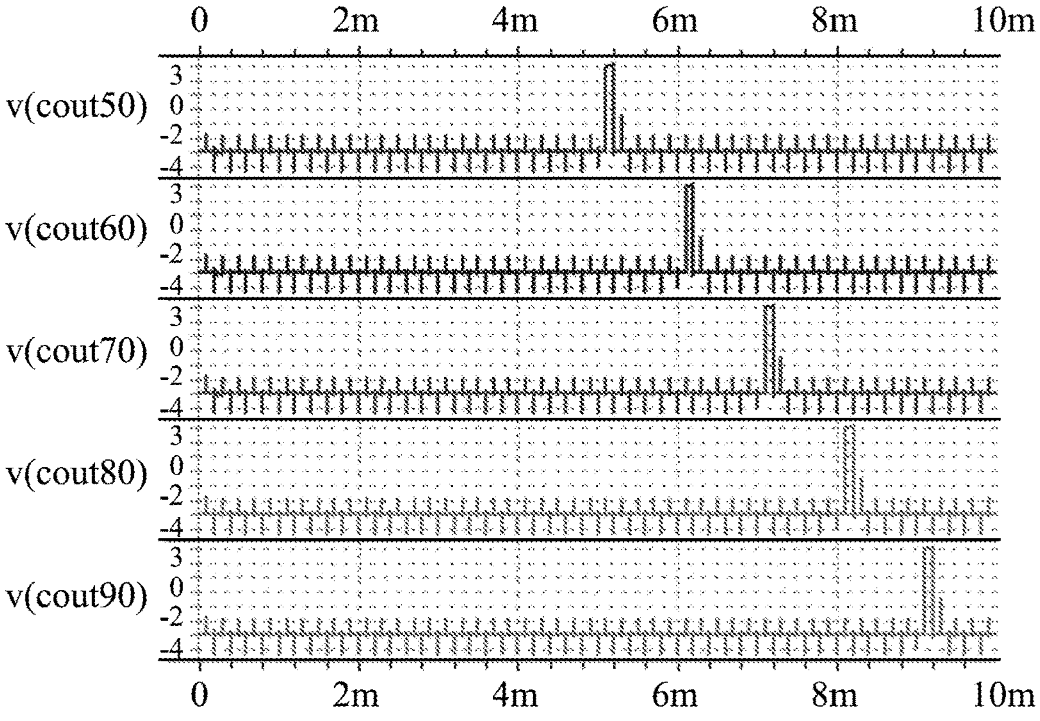
Figure 7:
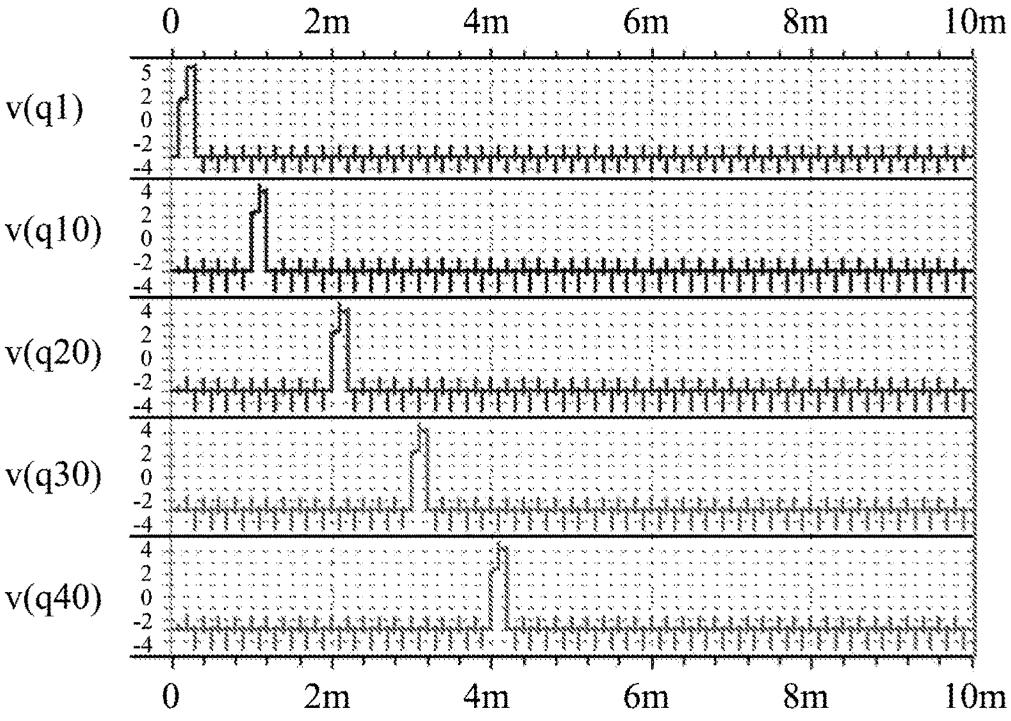
FIG. 7 and FIG. 8 are waveform diagrams of driving nodes of various stages scan driving circuits according to some embodiments of the present disclosure.
Figure 8:
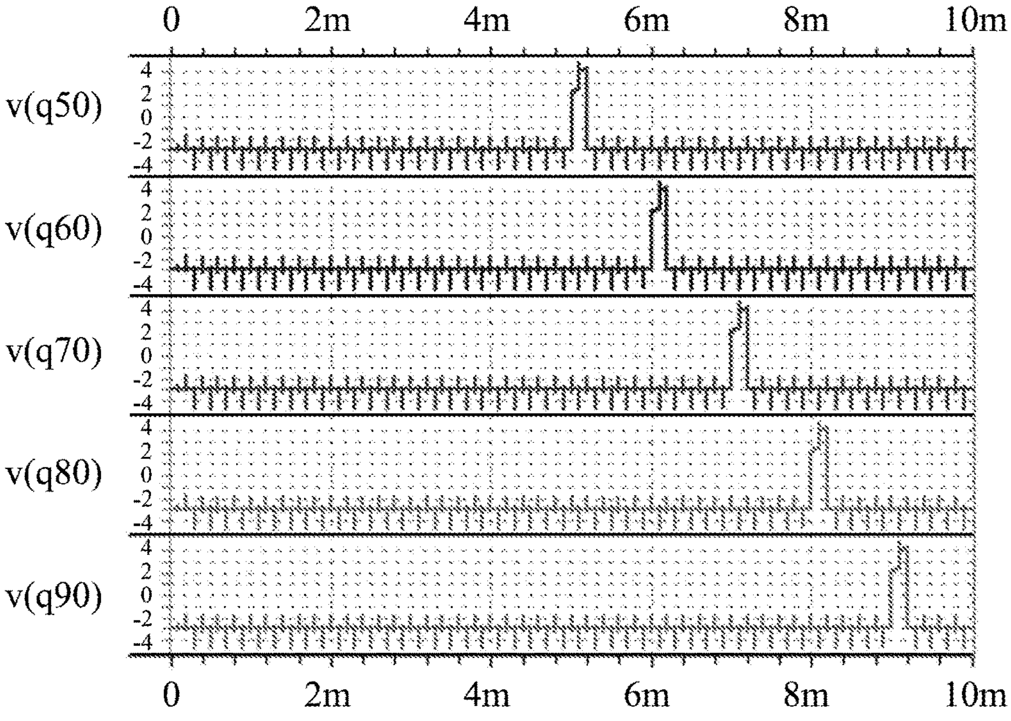
Figure 9:
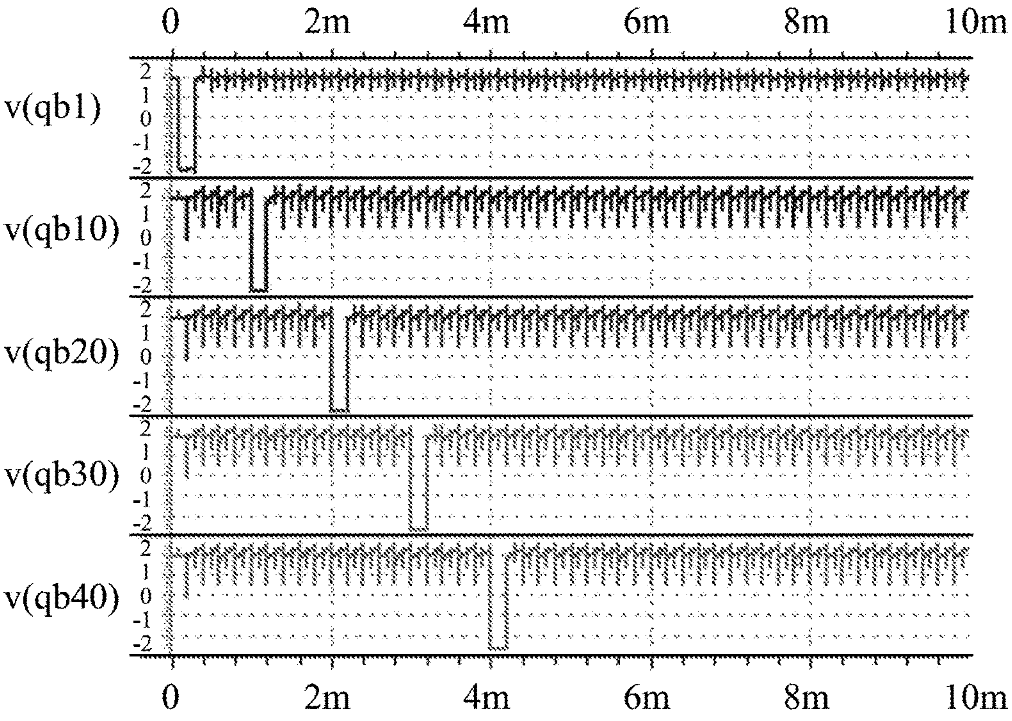
FIG. 9 and FIG. 10 are waveform diagrams of connection points of various stages scan driving circuits according to some embodiments of the present disclosure.
Figure 10:
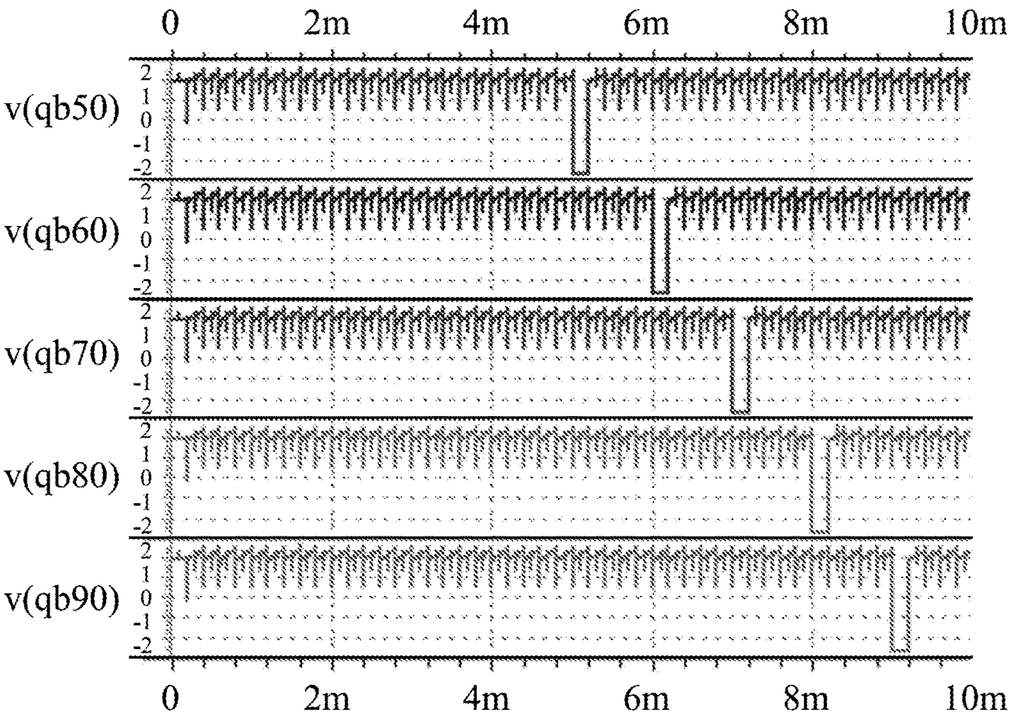

In order to specifically describe the waveforms of various stages scan driving circuits, refer to FIG. 1 to FIG. 10. FIG. 3 and FIG. 4 are waveform diagrams of output terminals G(n) of various stages scan driving circuits according to some embodiments of the present disclosure; FIG. 5 and FIG. 6 are waveform diagrams of second start signal terminals Cout(n) of various stages scan driving circuits according to some embodiments of the present disclosure; FIG. 7 and FIG. 8 are waveform diagrams of driving nodes Q of various stages scan driving circuits according to some embodiments of the present disclosure; FIG. 9 and FIG. 10 are waveform diagrams of connection points Qb of various stages scan driving circuits according to some embodiments of the present disclosure.

As shown in FIG. 1 to FIG. 10, in an experimental example, the simulation takes the first voltage terminal VGH as a DC voltage of 3V, the second voltage terminal VGL as a DC voltage of −3V, and the first clock signal terminal CK1 and the second clock signal terminal CK2 receive the AC signal having the high voltage 3V and the low voltage −3V. The simulation calculates the rise time and fall time of output terminal G(n), the rise time is defined as the time of 10% to 90% voltage change in the range from −3V to 3V, and the fall time is defined as 90% to 10% voltage change in the range from 3V to −3V. The simulation shows the waveform results of the simulated 1-90 stages gate line at room temperature.

At room temperature of 25 degrees Celsius, the rise time of the output terminal q1 of the first-stage scan driving circuit is about 99.9 μs, and the fall time is about 0.142 μs. The rise time of the output terminal q10 of the tenth-stage scan driving circuit is about 100 μs, and the fall time is about 0.191 μs. The rise time of the output terminal q20 of the twentieth-stage scan driving circuit is about 100 μs, and the fall time is about 0.192 μs. The rise time of the output terminal q30 of the thirtieth-stage scan driving circuit is about 100 μs, and the fall time is about 0.192 μs. The rise time of the output terminal q40 of the fortieth-stage scan driving circuit is about 100 μs, and the fall time is about 0.193 μs. The rise time of the output terminal q50 of the fiftieth-stage scan driving circuit is about 100 μs, and the fall time is about 0.192 μs. The rise time of the output terminal q60 of the sixtieth-stage scan driving circuit is about 100 μs, and the fall time is about 0.193 μs. The rise time of the output terminal q70 of the seventieth-stage scan driving circuit is about 100 μs, and the fall time is about 0.193 μs. The rise time of the output terminal q80 of the 80th-stage scan driving circuit is about 100 μs, and the fall time is about 0.192 μs. The rise time of the output terminal q90 of the 90th-stage scan driving circuit is about 100 μs, and the fall time is about 0.192 μs.

In practice, for example, the scan driving circuit 100 has a relatively small number of transistors (e.g., thin film transistors), eliminates the coupling capacitance required by the traditional gate driving circuit, and the scan driving circuit 100 is easily integrated on the glass of the display without an additional integrated circuit, thereby not only reducing the cost, but also simplifying the structure, but the present disclosure is not limited thereto.

In view of the above, according to the present disclosure, the scan driving circuit 100 and its operation method of the present disclosure can prevent the problem of electric leakage in the non-working state, so as to achieve the effect of saving power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A scan driving circuit, comprising:

a pull-up output charging circuit electrically connected to an output terminal;

a pull-down discharge circuit electrically connected to the output terminal;

a pre-charge circuit electrically connected to the pull-up output charging circuit and the pull-down discharge circuit through a driving node;

an anti-noise start-up circuit electrically connected to the pre-charge circuit; and an anti-noise pull-down discharge circuit electrically connected to the anti-noise start-up circuit, and the anti-noise pull-down discharge circuit electrically connected to the driving node.

2. The scan driving circuit of claim 1, further comprising:

a voltage boost circuit electrically connected to the driving node.

3. The scan driving circuit of claim 2, wherein the voltage boost circuit comprises:

a transistor electrically connected to the driving node through a capacitor, wherein one end of the transistor is electrically connected to the capacitor, and another end and a gate of the transistor is electrically coupled to a driving node of a next-stage scan driving circuit.

4. The scan driving circuit of claim 1, wherein the pre-charge circuit comprises:

two transistors connected in series with each other, wherein the two transistors are electrically connected between a first start signal terminal and the driving node, and two gates of the two transistors are electrically connected to a first clock signal terminal.

5. The scan driving circuit of claim 1, wherein the pull-up output charging circuit comprises:

a transistor electrically connected between a first voltage terminal and the output terminal, wherein a gate of the transistor is electrically connected to a connection point between the anti-noise start-up circuit and the anti-noise pull-down discharge circuit; and another transistor electrically connected between a second start signal terminal and a second clock signal terminal, wherein a gate of the another transistor is electrically connected to the driving node.

6. The scan driving circuit of claim 1, wherein the pull-down discharge circuit comprises:

a transistor electrically connected between a second voltage terminal and a second start signal terminal, wherein a gate of the transistor is electrically connected to a connection point between the anti-noise start-up circuit and the anti-noise pull-down discharge circuit; and another transistor electrically connected between the output terminal and the second voltage terminal, wherein a gate of the another transistor is electrically connected to the driving node.

7. The scan driving circuit of claim 1, wherein the anti-noise start-up circuit comprises:

two transistors connected in series with each other, wherein the two transistors are electrically connected between a second voltage terminal and a first voltage terminal, a gate of one of the two transistors is electrically connected to the pre-charge circuit, and a gate of another of the two transistors is electrically connected to the first voltage terminal; and another two transistors connected in series with each other, wherein the another two transistors are electrically connected between the second voltage terminal and the first voltage terminal, a gate of one of the another two transistors is electrically connected to the pre-charge circuit, and a gate of another of the another two transistors is electrically connected between the two transistors.

8. The scan driving circuit of claim 1, wherein the anti-noise pull-down discharge circuit comprises:

two transistors connected in series with each other, wherein the two transistors are electrically connected between a second voltage terminal and the driving node, and two gates of the two transistors are electrically connected to the anti-noise start-up circuit.

9. The scan driving circuit of claim 1, wherein the pull-up output charging circuit is electrically connected to a first voltage terminal, the pull-down discharge circuit is electrically connected to a second voltage terminal, the anti-noise start-up circuit is electrically connected between the second voltage terminal and the first voltage terminal, the anti-noise pull-down discharge circuit is electrically connected between the second voltage terminal and the driving node, and a first voltage level of the first voltage terminal is higher than a second voltage level of the second voltage terminal.

10. The scan driving circuit of claim 1, wherein the pre-charge circuit is controlled by a first clock signal terminal, the pre-charge circuit is electrically connected between a first start signal terminal and the driving node, the pull-up output charging circuit and the pull-down discharge circuit both are electrically connected to a second start signal terminal, the pull-up output charging circuit is electrically connected to a second clock signal terminal, and a second clock signal of the second clock signal terminal is opposite to a first clock signal of the first clock signal terminal.

11. A scan driving circuit, comprising:

a pull-up output charging circuit electrically connected to a first voltage terminal;

a pull-down discharge circuit electrically connected to a second voltage terminal, wherein a first voltage level of the first voltage terminal is higher than a second voltage level of the second voltage terminal;

an anti-noise pull-down discharge circuit electrically connected to the pull-up output charging circuit and the pull-down discharge circuit through a driving node, wherein the pull-up output charging circuit and the pull-down discharge circuit are electrically connected to an output terminal; and an anti-noise start-up circuit electrically connected to the anti-noise pull-down discharge circuit, wherein in a non-working state, the anti-noise start-up circuit enables the anti-noise pull-down discharge circuit to pull down an electric potential of the driving node, so as to disable the pull-down discharge circuit and to enable the pull-up output charging circuit, thereby pulling up an electric potential of the output terminal.

12. The scan driving circuit of claim 11, further comprising:

a pre-charge circuit electrically connected between a first start signal terminal and the driving node, wherein the pre-charge circuit is controlled by a first clock signal terminal, and in a start period, the first clock signal terminal turns on the pre-charge circuit, the first start signal terminal receives a first start signal, so that the pre-charge circuit charges the driving node to a first driving level for disabling the pull-up output charging circuit and enabling the pull-down discharge circuit, thereby pulling down the electric potential of the output terminal to output a control signal.

13. The scan driving circuit of claim 11, further comprising:

a voltage boost circuit electrically connected to the driving node, wherein in a voltage enhancement period, the voltage boost circuit feeds a voltage of a driving node of a next-stage scan driving circuit back to couple the driving node of the scan driving circuit, thereby the driving node is boosted from a first driving level to a second driving level, so that the electric potential of the output terminal is maintained to output a control signal.

14. The scan driving circuit of claim 11, further comprising:

a pre-charge circuit electrically connected between a first start signal terminal and the driving node, wherein the pre-charge circuit is controlled by a first clock signal terminal, and in an output completion period, the first start signal terminal is in the second voltage level, the first clock signal terminal turns on the pre-charge circuit, so that the pre-charge circuit pulls down the electric potential of the driving node, for enabling the pull-up output charging circuit to pull up the electric potential of the output terminal, thereby completing an output of a control signal.

15. The scan driving circuit of claim 11, wherein the anti-noise start-up circuit is electrically connected between the second voltage terminal and the first voltage terminal, the anti-noise pull-down discharge circuit is electrically connected between the second voltage terminal and the driving node, and in an anti-noise period, the anti-noise start-up circuit electrically isolates the second voltage terminal from a connection point between the anti-noise start-up circuit and the anti-noise pull-down discharge circuit, the anti-noise start-up circuit increases an electric potential of the connection point through the first voltage level of the first voltage terminal to turn on the anti-noise pull-down discharge circuit, thereby pulling down the electric potential of the driving node.

16. An operation method of a scan driving circuit, the scan driving circuit comprising a pull-up output charging circuit, a pull-down discharge circuit, an anti-noise start-up circuit and an anti-noise pull-down discharge circuit, the anti-noise pull-down discharge circuit electrically connected to the pull-up output charging circuit and the pull-down discharge circuit through a driving node, the pull-up output charging circuit and the pull-down discharge circuit electrically connected to an output terminal, and the operation method comprising:

in a non-working state, enabling the anti-noise pull-down discharge circuit through the anti-noise start-up circuit to pull down an electric potential of the driving node; and when the electric potential of the driving node is pulled down, disabling the pull-down discharge circuit and enabling the pull-up output charging circuit, thereby pulling up an electric potential of the output terminal.

17. The operation method of claim 16, wherein the scan driving circuit further comprises a pre-charge circuit, and the operation method further comprises:

in a start period, charging the driving node to a first driving level through the pre-charge circuit, for disabling the pull-up output charging circuit and enabling the pull-down discharge circuit, thereby pulling down the electric potential of the output terminal to output a control signal.

18. The operation method of claim 16, wherein the scan driving circuit further comprises a voltage boost circuit, and the operation method further comprises:

in a voltage enhancement period, feeding a voltage of a driving node of a next-stage scan driving circuit back to couple the driving node of the scan driving circuit, so as to boost the driving node from a first driving level to a second driving level, so that the electric potential of the output terminal is maintained to output a control signal.

19. The operation method of claim 16, wherein the scan driving circuit further comprises a pre-charge circuit, and the operation method further comprises:

in an output completion period, pulling down the electric potential of the driving node through the pre-charge circuit, for enabling the pull-up output charging circuit to pull up the electric potential of the output terminal, thereby completing an output of a control signal.

20. The operation method of claim 16, wherein the anti-noise start-up circuit is electrically connected between a second voltage terminal and a first voltage terminal, a first voltage level of the first voltage terminal is high than a second voltage level of the second voltage terminal, the anti-noise pull-down discharge circuit is electrically connected between the second voltage terminal and the driving node, and the operation method further comprises:

in an anti-noise period, using the anti-noise start-up circuit for electrically isolating the second voltage terminal from a connection point between the anti-noise start-up circuit and the anti-noise pull-down discharge circuit, so that the anti-noise start-up circuit increases an electric potential of the connection point through the first voltage level of the first voltage terminal to turn on the anti-noise pull-down discharge circuit, thereby pulling down the electric potential of the driving node.

* * * * *